United States Patent
Klamp et al.

(10) Patent No.: US 11,299,408 B2
(45) Date of Patent: Apr. 12, 2022

(54) METHOD AND ASSEMBLY FOR RECOVERING MAGNESIUM AMMONIUM PHOSPHATE

(71) Applicant: CNP CYCLES GMBH, Karlstein am Main (DE)

(72) Inventors: Thomas Klamp, Hanau (DE); Bernhard Ortwein, Erlangen (DE)

(73) Assignee: CNP CYCLES GMBH, Karlstein am Main (DE)

( * ) Notice: Subject to any disclaimer, the term of this patent is extended or adjusted under 35 U.S.C. 154(b) by 25 days.

(21) Appl. No.: 16/962,641

(22) PCT Filed: Dec. 17, 2018

(86) PCT No.: PCT/EP2018/085295
§ 371 (c)(1),
(2) Date: Sep. 1, 2020

(87) PCT Pub. No.: WO2019/141460
PCT Pub. Date: Jul. 25, 2019

(65) Prior Publication Data
US 2021/0032133 A1  Feb. 4, 2021
US 2021/0331950 A9  Oct. 28, 2021

(30) Foreign Application Priority Data
Jan. 18, 2018  (DE) .................. 10 2018 101 081.8

(51) Int. Cl.
C02F 1/52  (2006.01)
C02F 3/30  (2006.01)
C02F 101/10  (2006.01)

(52) U.S. Cl.
CPC .......... *C02F 1/5254* (2013.01); *C02F 1/5281* (2013.01); *C02F 3/308* (2013.01);
(Continued)

(58) Field of Classification Search
CPC .... C02F 9/00; C02F 1/001; C02F 1/24; C02F 3/1278; C02F 3/28; C02F 3/308;
(Continued)

(56) References Cited

U.S. PATENT DOCUMENTS 3,397,788 A   8/1968  Duff et al.
4,800,021 A   1/1989  Desbos
(Continued)

FOREIGN PATENT DOCUMENTS

DE          101 12 934 A1   10/2002
DE    10 2008 050 349 A1    5/2009
(Continued)

OTHER PUBLICATIONS

Machine-generated English Translation of EP3228599, dated Oct. 8, 2021.*
(Continued)

*Primary Examiner* — Fred Prince
(74) *Attorney, Agent, or Firm* — Ladas & Parry LLP; Malcolm J. MacDonald

(57) ABSTRACT

The invention relates to a method and an assembly for recovering magnesium ammonium phosphate from slurry that is supplied to a reaction container (10) in which an aerobic milieu is present and in which the slurry is guided in a circuit with the aid of ventilation. Cationic magnesium, such as magnesium chloride, is added to the slurry, and magnesium ammonium phosphate crystals which are precipitated from the slurry are removed via a removal device (30) provided in the base region of the reaction container. Substances which contain magnesium ammonium phosphate crystals collected in the removal device (30) are loosened and/or rinsed.

16 Claims, 3 Drawing Sheets

Figure 1:
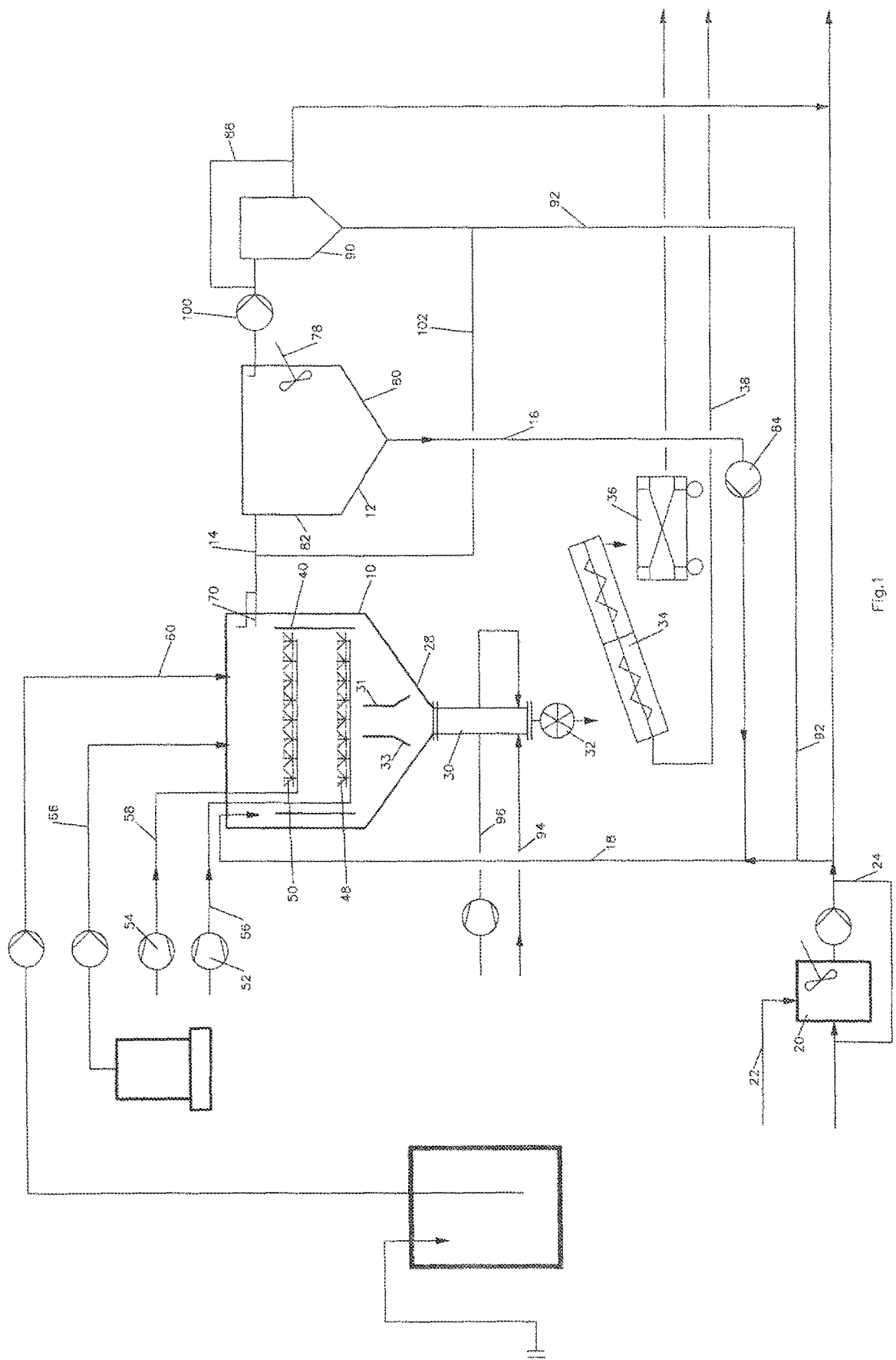

(52) U.S. Cl.
CPC ..... *C02F 2001/5218* (2013.01); *C02F 2101/105* (2013.01); *C02F 2201/002* (2013.01); *C02F 2203/006* (2013.01); *C02F 2303/06* (2013.01); *C02F 2305/00* (2013.01)

(58) Field of Classification Search
CPC ............... C02F 11/04; C02F 2101/105; C02F 2201/005; C02F 2209/08; C02F 2209/10; C02F 2301/046; C02F 3/12; C02F 1/5245; C02F 3/2866; C02F 3/284; C02F 3/2846; C02F 2101/30; C02F 2203/006; Y02W 10/10; Y02E 50/30
USPC .... 210/765, 749, 753, 754, 767, 702, 198.1, 210/205, 207, 221.1, 221.2, 259, 906, 210/907, 620, 631
See application file for complete search history.

(56) References Cited

U.S. PATENT DOCUMENTS

| | | | |
|---|---|---|---|
| 5,441,634 A | 8/1995 | Edwards | |
| 9,670,083 B2* | 6/2017 | Wett | C02F 3/28 |
| 2006/0196835 A1* | 9/2006 | Shimamura | C02F 1/52 210/712 |
| 2017/0291816 A1* | 10/2017 | Knorle | C02F 1/5254 |
| 2019/0119138 A1* | 4/2019 | Maher | C02F 11/121 |
| 2019/0144320 A1* | 5/2019 | Nilsen | C12M 45/06 210/603 |
| 2021/0179458 A1* | 6/2021 | Ortwein | C02F 1/5254 |

FOREIGN PATENT DOCUMENTS

| | | |
|---|---|---|
| EP | 2 028 161 A1 | 2/2009 |
| JP | H09136091 A | 5/1997 |
| JP | 2004305991 A | 11/2004 |

OTHER PUBLICATIONS

Machine-generated English Translation of EP 2028161, dated Oct. 8, 2021.*
International Search Report, dated Apr. 4, 2019, corresponding to International Application No. PCT/EP2018/085295.
Stumpf, D., "Phosphorrecycling durch MAP-Ausfällung im kommunalen Faulschlamm", 2007.
German Office Action, dated Mar. 22, 2021, corresponding to German Application No. 10 2018 101 081.8.

* cited by examiner

METHOD AND ASSEMBLY FOR RECOVERING MAGNESIUM AMMONIUM PHOSPHATE

The invention relates to a method for recovering magnesium ammonium phosphate (MAP) from sludge supplied to a reaction tank in which an aerobic environment prevails and in which the sludge is guided in a cycle supported by aeration, with cationic magnesium such as magnesium chloride being added to the sludge and magnesium ammonium phosphate crystals (MAP crystals) precipitated from the sludge being removed via an extraction device provided in the floor area of the first reaction tank.

The invention furthermore relates to an arrangement for recovering magnesium ammonium phosphate during sludge treatment, comprising a reaction tank with an upper section that merges into a lower section from which in turn extends an extraction device for magnesium ammonium phosphate crystals. At least one aeration device should be provided in the upper section.

Phosphorus is a vital substance for organisms; it is found in the earth's crust in un-isolated form, and there is no substitute for it at least in flora and fauna and in living organisms. Phosphorus is for example required for the production of food, as fertilizer for plant growth, and in industry, for example in iron and steel production. Phosphorus is extensively used in particular in agriculture.

Even if it seems that the natural occurrence of phosphorus will not be exhausted for many decades, extensive efforts are in progress to recover phosphorus. Recovering phosphorus from waste water is of particular importance here.

There are many methods for recovering phosphorus, for example from sludge water by adsorption, precipitation, crystallization or using pellets, or from digested sludge by means of or without leaching, or from ash by thermal treatment thereof.

DE 101 12 934 B4 indicates a method in which digested sludge is aerated to increase its pH value by $CO_2$ stripping, in order to precipitate MAP while adding magnesium chloride at the same time.

The same principle is applied in accordance with EP 2 028 161 B1. To do so, a reaction tank is used in which sludge is guided in a cycle. Precipitated MAP crystals collect in a floor area of funnel-shaped design, in order to then be extracted via an extraction device shuttable on two sides. Both the MAP crystals and sludge are extracted here.

The sludge contains, in addition to macrocrystals which are separable without any problem, microcrystals that are not separable by the usual separation methods.

DE 10 2008 050 349 B4 describes a method for precipitation of phosphorus from phosphate-contaminated waste water while forming MAP crystals. The waste water first passes through an anaerobic stage, and is then mixed with air in a stripping stage and subsequently mixed with magnesium chloride in a crystallization stage. The MAP pellets forming are removed from the floor of the reactor.

From JP 2004305991 A, a device and a method are known for recovering magnesium ammonium phosphate (MAP) which is/are used in waste water and sewage sludge treatment. The waste water containing the sludge is mixed with air and magnesium chloride. The heavy MAP particles are passed into a lower funnel of the device and extracted from there via a pipe.

The reference Stumpf, D., *"Phosphorrecycling durch MAP-Ausfällung im kommunalen Faulschlamm"*, offers an overview of existing methods for phosphorus recycling by MAP precipitation and for separation of the precipitation product. Conventionally, this takes place after the anaerobic treatment of sewage sludge and/or primary sludge. MAP precipitation is as a rule performed in precipitation reactors or fluidized-bed reactors in which the pH value is increased by alkali addition or by air stripping, and with or without the addition of magnesium precipitants. MAP is conventionally precipitated directly from the digested sludge or from the process water of sludge dewatering. The precipitated MAP can be separated using screens, hydrocyclones or centrifuges.

The object underlying the present invention is to develop a method and an arrangement of the type mentioned at the outset such that a high phosphorus recovery rate is enabled. In particular, microcrystals should also be available for phosphorus recovery.

To solve the object, the method substantially proposes that substances containing magnesium ammonium phosphate crystals and collected in the extraction device are loosened up and/or flushed.

In accordance with the invention, a loosening and/or flushing of the collected substances takes place in the extraction device, whereby the MAP crystals are graded such that heavy MAP crystals remain in the lower area of the extraction device, while smaller or micro MAP crystals and sludge particles and flocs rise and are washed back into the reaction tank. This results in the advantage that the crystals are subjected to the process taking place in the reaction tank, enabling further growth, i.e. crystals are created in a size that makes them separable by the usual measures.

For loosening/flushing, gas and liquid are introduced into the extraction device, where it is provided in particular that the gas, such as air, or the liquid, such as water, in particular service water, is introduced in the floor area of the interior of the extraction device, which preferably has a hollow-cylindrical internal geometry.

To do so, liquid and gas should be introduced into the extraction device in particular alternatingly or simultaneously.

In a divergence from the prior art, it is furthermore provided that for implementation of the invention the extraction device must be closable only on the floor side, resulting in a simple design; because according to EP 2 028 161 B1 the extraction device necessarily has on the reaction tank side a slide valve which closes the extraction device when the substances containing the MAP crystals are to be extracted.

In an embodiment of the invention, it is provided that the substances exiting the extraction device on the tank side are guided by means of a guide through a funnel-shaped or conical lower section of the reaction tank to an adjoining cylindrical upper section. This guide is in particular a hollow-cylindrical device such as a pipe which is widened on the extraction device side, the longitudinal axis of the guide coinciding with the longitudinal axis of the extraction device.

It is ensured by the measures in this respect that the flushed-out microcrystals and sludge flocs are returned to the process in order to enable growth of the microcrystals to a size that permits problem-free separation after extraction at a later point in time from the extracting funnel. An arrangement of the type mentioned at the outset is characterized in particular in that the extraction device has at least one first connection for gas to be introduced and/or at least one second connection for liquid to be introduced, and that in the floor area of the extraction device in particular, several first connections and/or several second connections are provided preferably evenly distributed around the circumference of the extraction device.

First and second connections are preferably connected alternatingly to the extraction device.

The interior of the extraction device has a cylindrical or conical geometry.

In particular, and in a divergence from the prior art, it is provided that the extraction device is designed closure-free on the tank side.

On the floor side, the extraction device should have a closure device, such as a shutoff valve or rotary valve.

While the method in accordance with the invention can be performed with a single reaction tank, as is possible according to EP 2 028 161 B1, it is however in particular provided that sludge is supplied from a first reactor tank to a second reactor tank in which an anaerobic environment is set for phosphorus redissolution, and that magnesium ammonium phosphate crystals precipitated in the second reaction tank are supplied to the first reaction tank.

Two reaction tanks are used, which are set differently in respect of their environment such that there is an aerobic environment in the first tank and an anaerobic environment in the second tank. The latter permits phosphorus redissolution.

The sludge discharged from the first reaction tank is supplied to the second reaction tank.

If bacteria contained in the digested sludge have absorbed more phosphate in the first reaction tank under aerobic conditions parallel to orthophosphate crystallization, phosphorus redissolution can take place under anaerobic conditions in the second reaction tank, leading to further MAP crystal formation or to crystal growth. Crystal formation also includes here microcrystals, which are supplied to the first reaction tank as seed crystals.

It is possible that sludge, basically a sludge/water mix, is extracted continuously or in batches from the preferably conically designed floor area of the second reaction tank and returned to the first reaction tank. Recirculation takes place.

A cycle is formed in which the first and second reaction tanks are located, in order to supply from the first reaction tank to the second reaction tank sludge or a sludge/water mix of which at least part is returned to the first reaction tank, i.e. recirculated.

Discharge from the second reaction tank is achieved in particular using an extraction pump.

The inflowing sludge/water mix, for simplicity's sake referred to as sludge, which is not recirculated into the first reaction tank, optionally passes, for example via an extraction pump, to a separator in which MAP crystals are separated, which are then supplied to the first reaction tank. The separator is in particular a cyclone separator, such as a hydrocyclone.

There is however also the possibility that the sludge/water mix taken from the second reaction tank and not recirculated into the first reaction tank bypasses the optionally connected separator in order to be subjected directly to dewatering.

According to the prior art, it is provided that the pH value in the first reaction tank is set by $CO_2$ stripping with simultaneous dissolving of $O_2$. The latter creates an aerobic environment.

The carbon dioxide is stripped out by fine-bubble, medium-bubble or large-bubble pressure aeration in the first reaction tank, so that the pH value is set, i.e. increased, as already mentioned. By contrast, only a weak agitation movement is performed in the second reaction tank, allowing an anaerobic environment to form and thereby permitting the redissolution of orthophosphate. As a result, further MAP crystals can form in the second reaction tank, which include so-called microcrystals and are conveyed as seed crystals or crystal nuclei into the first reaction tank.

Crystal growth takes place in the first reaction tank, by the microcrystals growing into macrocrystals. By contrast, it is substantially microcrystals that form inside the anaerobic second reaction tank due to redissolution.

Microcrystals are used to grow large crystals, because microcrystals have a size or weight which mean that it is only with great difficulty that they can be separated from the sludge, if at all, using the standard separation techniques. By contrast, macrocrystals can be readily separated from the sludge.

For aeration of the sludge or sludge/water mix in the first reaction tank, it is provided that the first reaction tank is split into an upper section and a lower section, where the lower section should have a conical shape and merge into the extraction device for MAP crystals. The upper section is cylindrical and is split into an inner area and an outer area by a partition wall forming a circle in its cross-section, so that an inner cylindrical area and an outer circular-cylindrical area are created.

The partition wall, which can also be referred to as a cylindrical shaft fitting, starts in the upper area of the first reaction tank below the sludge level and ends in the lower area at the transition between the upper section and the lower section having a conical shape. Accordingly, the first reaction tank is split into three areas, i.e. an inner cylindrical area, a cylinder ring-shaped outer area, and the conical lower section.

The sludge is aerated in the interior of the cylindrical inner area, in particular by membrane aerators. It is provided here in particular that inside the inner area along the height of the reaction tank, aerating elements such as membrane aerators are arranged either only in the lower area or on two levels at a distance from one another.

The introduction of air via the aerating elements serves the following purposes:

Mixing in the first reaction tank and/or creation of a directed flow profile of the sludge or sludge/water mix, Grading of MAP crystals, Gas exchange in the sludge/water mix for $CO_2$ stripping.

Mixing in the first reaction tank and creation of the desired directed flow of the sludge or sludge/water mix in the inner area of the reaction tank by the introduction of air take place due to the resultant density difference between the "heavier" medium in the unaerated outer cylinder ring section and the "lighter" medium in the aerated inner area, and by the expulsion force of air bubbles and the uplift force initiated thereby. Due to the uplift force of the added air bubbles, the sludge/water mix is sucked in from the cylinder ring section below the partition wall between the inner and outer areas to the middle of the tank, permeated with air, and then driven in the uplift direction inside the inner area in a vertical flow to the sludge surface. At the surface, the sludge/water mix then degasses and flows horizontally above the partition wall and outwards to the peripherally extending cylinder ring section. This is followed by the vertical downward movement in the outer unaerated cylinder ring section in the direction of the tank floor, i.e. the lower section having a conical shape.

The driving force in the cycle described is the energy input by adiabatic compression of air in a compressor and by subsequent polytropic expansion following introduction to the sludge/water mix.

The uplift force in the interior of the cylindrical area is also set by the energy input. This results in grading of the MAP crystal size, because the bigger the crystal structure, the greater its weight and accordingly its gravity-related sedimentation rate. Above a certain size and hence weight of the crystals, the uplift force is no longer sufficient to carry the crystals into the vertical upward flow in the cylindrical inner area, with the result that the crystals sediment in the lower area, i.e. in the conical lower section, and settle there.

By contrast, small crystals, i.e. those with low weight, can be carried along with the flow, so that they remain inside the process cycle until they grow to a size such that the weight of the crystals cannot be overcome by the uplift forces, with the result that they settle in the lower area.

The introduction of air in the lower area of the interior of the upper section of the first reaction tank also leads to stripping of $CO_2$ from the sludge/water mix. Dissolved carbon dioxide can be separated by the outflowing air and degasses at the sludge surface together with the air. At the same time, oxygen is added, making the environment aerobic.

The pH value increase achieved by stripping initiates, as magnesium is simultaneously provided by metering of in particular magnesium chloride or another suitable magnesium compound, MAP crystal formation or crystal growth.

The first reaction tank is supplied with sludge into the inner aerated area at the sludge level. The cationically bonded magnesium, in particular in the form of magnesium chloride, is metered onto the sludge surface preferably via the cylinder ring-shaped outer area.

In particular, it is provided that the sludge or the sludge/water mix is extracted from the outer cylinder ring section. It is therefore provided in an embodiment that there is a discharge shaft in the outer area of the upper section of the first reaction tank. Discharge should take place according to the positive displacement principle. When the first reaction tank is supplied with sludge, sludge in the same volume proportion is simultaneously washed out of the reaction tank. Displacement from the lower area of the outer cylinder ring section is into a discharge duct. Discharged sludge/water mix initially flows upwards in the discharge duct, starting from the floor area of the outer area, and over a discharge sill into an outlet area. The sludge/water mix discharge is then passed from the first reaction tank into the second reaction tank.

The second reaction tank is mixed to a minor extent without however being aerated. This creates the required anaerobic environment conditions, so that phosphorus redissolution can take place, leading as already mentioned to further MAP crystal formation or growth. The crystals thus created collect in the lower area, also designed in particular conical, of the second reaction tank so that they reach the first reaction tank by continuous or intermittent extraction of the sludge/water mix quantity. Recirculation of the sludge or sludge/water mix quantity follows.

The discharge from the second reaction tank is achieved by means of an extraction pump from the upper cylindrical tank part above the agitator.

There is the possibility that the digested sludge is optionally slightly acidified by the addition of acid before being supplied to the first reaction tank, in order to increase the orthophosphate concentration for intensification of subsequent MAP crystallization in the inflow to the first reaction tank.

An arrangement for recovering magnesium ammonium phosphate from sludge is characterized in particular in that the arrangement has a first reaction tank with a cylindrical upper section having an inner area and an outer area and merging into a lower section having a conical shape and from which section extends in turn an extraction device for magnesium ammonium phosphate crystals, at least one aeration device being provided in the inner area of the upper section, and a second reaction tank which is connected to the first tank to form a sludge-bearing cycle. It is provided here that a first line leading to the second reaction tank extends from a discharge of the first reaction tank, and a second line leading to the first reaction tank extends from the floor area of the second reaction tank.

It may be provided that the second reaction tank is optionally connected via an extraction pump to a separator, such as a cyclone separator, that separates magnesium ammonium phosphate crystals, which is connected via a third line to the first reaction tank and/or via a fourth line to the second reaction tank and via which MAP crystals can be supplied to the first reaction tank and/or to the second reaction tank.

In particular, it is provided that inside the inner area of the first reaction tank one or more aeration devices are arranged either only in the lower area or on two levels at a distance from one another over its height.

Furthermore, an infeed for cationic magnesium should lead to the sludge surface, preferably via the outer area of the first reaction tank designed in cylinder ring shape.

In an embodiment, it is provided that the first reaction tank is connected to a sludge supply line which is optionally connected to a pre-acidification device.

Further details, advantages and features of the invention can be gathered not only from the claims and in the features to be found therein, singly and/or in combination, but also from the following description of preferred examples to be found in the drawing.

Figure 2:
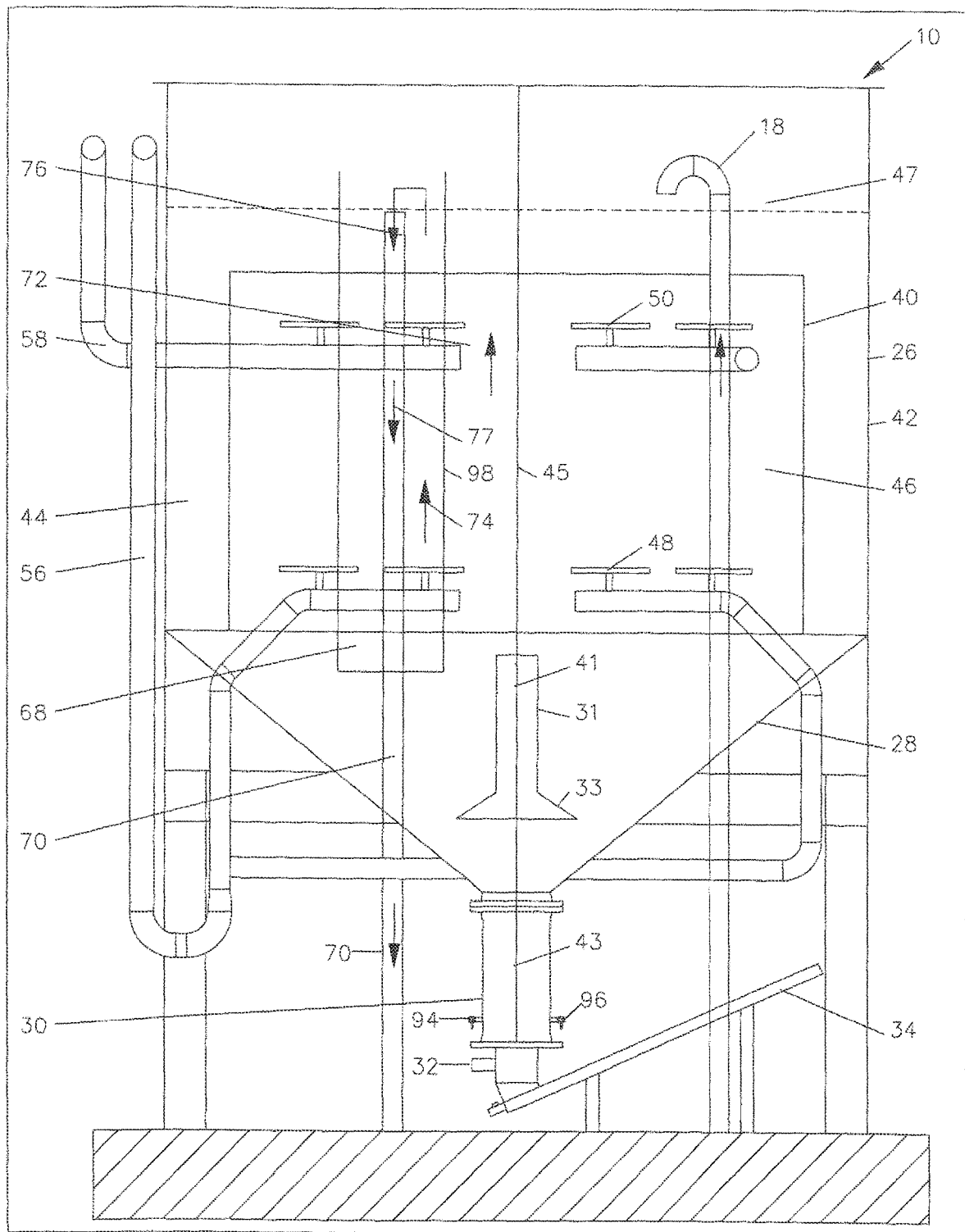
Figure 3:
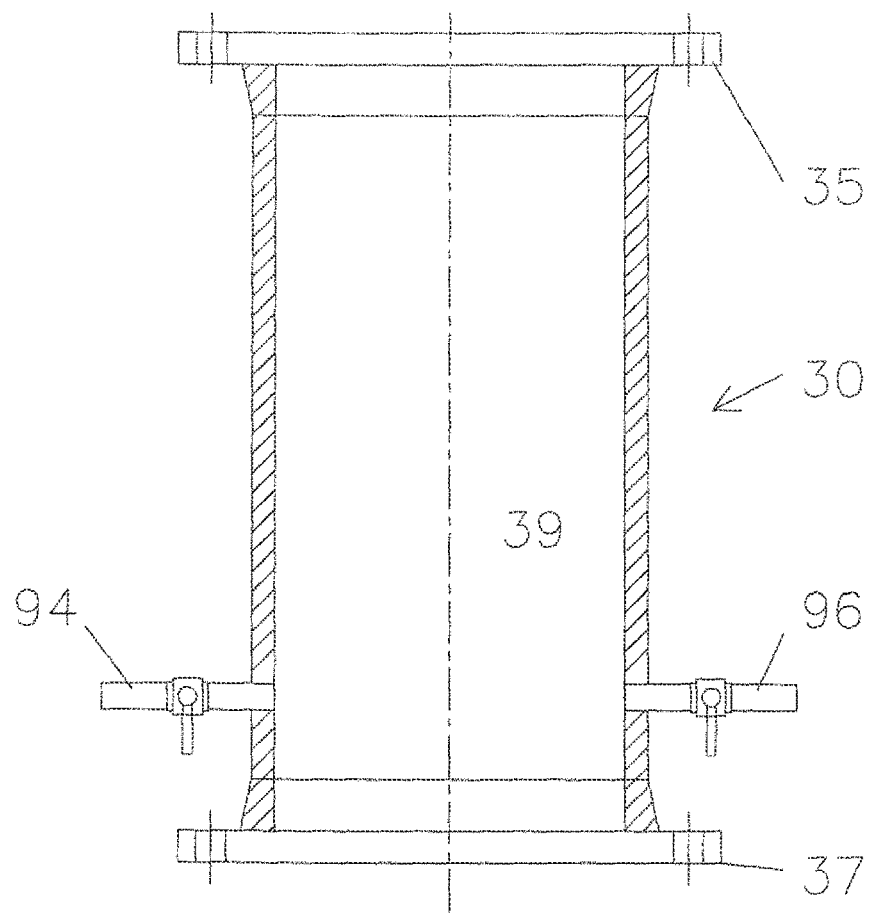
Figure 4:
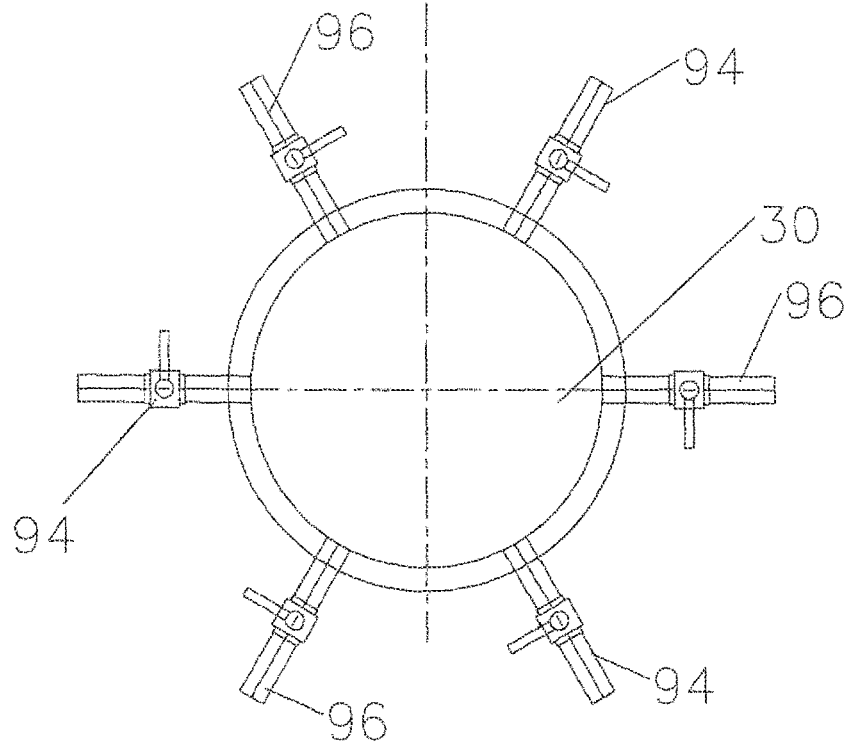

The drawing shows in:

FIG. 1 an illustration of the principle of an arrangement for recovering magnesium ammonium phosphate, FIG. 2 an illustration of the principle of a first reaction tank, FIG. 3 an enlarged illustration of an extraction device shown in FIGS. 1 and 2 and FIG. 4 a cross-section of the extraction device according to FIG. 3.

On the basis of the figures, a two-stage method is described by means of which magnesium ammonium phosphate crystals are precipitated from digested sludge, without this being intended to restrict the teachings in accordance with the invention. Instead the teachings also relate to single-stage methods for precipitating magnesium ammonium phosphate crystals.

The two-stage method is explained purely in principle on the basis of FIG. 1.

Substantial components of the arrangement for recovering phosphorus, i.e. for precipitating magnesium ammonium phosphate crystals, are a first reaction tank 10 in which an aerobic environment prevails, and a second reaction tank 12 with an anaerobic environment. The first reaction tank 10 is connected via a first line 14 to the second reaction tank 12, which in turn is connected via a second line 16 to the first reaction tank 10 for recirculation of magnesium ammonium phosphate crystals or of sludge containing crystal nuclei. This second line 16 preferably leads into a line 18 via which sludge is supplied from a sludge digestion plant to the first reaction tank 10.

If required, the digested sludge can be slightly acidified by acid, for example $H_2SO_4$, before being supplied to the first reaction tank 10, in order to increase the orthophosphate concentration for intensification of subsequent magnesium ammonium phosphate (MAP) crystallization in the inflow to the first reaction tank 10.

According to the illustration of the principle in FIG. 1, the sludge can optionally flow through a tank 20 to which is supplied an acid, for example $H_2SO_4$, via a line 22. If such an acidification is not required, a bypass line 24 is provided in order to permit supply of the sludge directly to the first reaction tank 10.

The first reaction tank 10 consists, according to the illustration of the principle in FIG. 2, of an upper cylindrical section 26 and a lower conical or funnel-shaped designed lower section 28. The funnel-shaped lower section 28 merges into an extraction device 30 referred to as a separator in which MAP crystals are collected, in order to supply them to a container 36 after opening of, for example, a rotary valve 32 or an otherwise secured outlet device via a dewatering screw 34. The dewatering water produced during conveying via the screw 34 is extracted via a line 38.

Substantial features can be found in self-explanatory form in FIGS. 3 and 4, in which the extraction device 30—referred to in the following as separator—is shown in more detail. The separator 30 has a hollow-cylindrical geometry and is connectable via a flange 35 to the outlet of the conical lower section 28 of the reaction tank 10. On the floor side, i.e. away from the tank, the separator 30 also has a flange 37, so that the separator 30 can be connected for example to the rotary valve 32 or to an otherwise secured outlet device.

In the floor area of the separator 30, connections 94, 96 are provided for loosening up and flushing MAP crystals of differing sizes and sludge or sludge flocs—referred to overall as substances—collected in the interior 39 of the separator 30. The connections 96 are provided for air and the connections 94 for water. The connections 94, 96 are alternatingly arranged, meaning that an air connection 96 is followed by a water connection 94 and vice versa.

Loosening up of the collected MAP crystals and flushing are achieved by preferably pulsating and/or alternating and/or simultaneous introduction of air and water. At the same time, the MAP crystals are graded, such that large, i.e. heavy MAP crystals remain in the lower area of the separator 30 while smaller and lighter MAP crystals, in particular microcrystals and sludge particles and flocs, rise and are washed back into the reaction tank 10. This ensures that small MAP crystals, which are hard to separate by the usual methods, are returned to the reaction tank 10 and hence back to the process. This leads to further growth of these small MAP crystals.

The separator 30 is closable on the floor side, while a closure does not have to be provided on the tank side.

To ensure that the washed-upward MAP crystals actually reach the upper cylindrical section 26 in order to grow, it is provided in accordance with the invention that above the separator 30 a guide 31, also having in particular a hollow-cylinder geometry, is arranged in the funnel-shaped lower section 28, the longitudinal axis 41 of the guide coinciding with the longitudinal axis 43 of the separator 30 and in particular also with the longitudinal axis 45 of the reaction tank 10.

The guide 31 has on the separator side a funnel-shaped widening 33, thereby ensuring that the substances washed upward and exiting from the separator 30 pass through the guide 31 to the upper section 26 of the reaction tank 10. It is ensured by these measures that the flushed-out microcrystals and sludge flocs are returned to the process, since the funnel-shaped lower section 28 of the reaction tank 10 can be flowed through vertically upwards. If a such a guide were not provided, the upward-directed flow would be slowed down by the flushing air and the flushing water by the widening of the flow profile in the funnel-shaped lower section 28, and the uplift force would be lost, with the result that the flushed-out substances would not reach the flow cycle, described in the following, in the cylindrical upper section 26 of the reaction tank 10. The flushed-out substances are picked up by the guide 31, also referred to as guide tube, and by the funnel-shaped widening 33 and guided selectively into the cylindrical upper section 26 of the reaction tank 10 or into the influence area of its upward-directed flow.

In other words, the guide 31 is used to guide flushed-out substances from the separator 30 directly into the interior 46 of the upper section 26 that is enclosed by the cylindrical partition wall 40.

A partition wall 40 forming a ring in section is installed in the upper section of the first reaction tank and is at a distance to the outer wall 42 of the upper section 26, such that between the partition wall 40 forming a hollow cylinder and the outer wall 42 of the first reaction tank 10 an outer area 44 ring-shaped in section is provided which equates to a cylinder ring section. The upper rim of the partition wall 40 is at a distance from the sludge level 47.

On the floor side, the partition wall 40 ends just above the area in which the upper section 26 merges into the lower section 28, as illustrated in the drawing.

Inside the interior 46 enclosed by the partition wall 40 are aerator devices 48, 50, in particular in the form of membrane aerators, for introducing air into the interior 46, which is filled with sludge/water mix.

The introduction of air must serves three purposes. The introduction of air achieves a directed flow profile of the sludge flowing inside the reaction tank 10 while mixing it. There is also a grading of the MAP crystals, as is explained in the following. Finally, there is a gas exchange in the sludge, which is basically a sludge/water mix, with $CO_2$ stripping and redissolution of oxygen taking place.

Mixing in the first reaction tank 10 and creation of the directed flow in the upper part 26 of the reaction tank 10 are generated by the resultant density difference between the unaerated medium inside the outer area 44 and the aerated medium in the interior 46, and by the uplift force of the air bubbles exiting the aerator devices 48, 50. Due to the difference between the "heavy" medium in the ring-shaped outer area 44 and the "lighter" medium in the interior 46, the sludge or sludge/water mix is drawn out of the annular area 44 to the middle of the tank, and accordingly flows around the lower rim of the partition wall 40.

Inside the interior 46, the sludge is permeated with air, in order to then be driven in the uplift direction in the interior 46 in a vertical flow to the sludge surface 47. At the sludge surface 47, the sludge/water mix degasses and then flows horizontally above the upper rim of the partition wall 40 and outwards to the annular area 44. In the outer and unaerated annular area 44, there is then a vertical downward movement in the direction of the lower section 28.

The driving force in the cycle described is the energy input by adiabatic compression of air in a compressor and by subsequent polytropic expansion following introduction to the sludge/water mix. The air is supplied to the membrane aerators 48, 50 by means of fans 52, 54 via lines 56, 58.

To enable MAP crystals to precipitate, the ammonium present in the sludge and cationic magnesium is required, which in the example is supplied in the form of magnesium chloride, onto the sludge surface 47, preferably via the annular area 44. In the illustration of the principle in FIG. 1, the magnesium chloride 5 is added via a line 60.

The energy input also sets the uplift force in the interior 46 of the upper section 26 of the first reaction tank 10. This grades the precipitating MAP crystal size. The bigger the crystal structure, i.e. the greater the weight of the MAP crystals, the greater the gravity-related sedimentation rate. Above a defined size and hence weight of the crystals, the lifting force in the interior 46 is insufficient to carry the crystals into the vertical upward flow, with the result that the crystals fall in the direction of the lower section 28 and sediment there, collecting in the separator 30. Smaller crystals are by contrast drawn along with the flow and carried in the process cycle until a size is reached that allows settling inside the conical or funnel-shaped lower section 28 and hence inside the separator 30.

The air introduced via the membrane aerators 48, 50 leads to stripping of $CO_2$ from the sludge/water mix. This increases the pH value, in particular to a value between 7.5 and 8.2. The pH value increase initiates, as magnesium is simultaneously provided by metering of magnesium chloride or another suitable magnesium compound, MAP crystal formation or crystal growth.

The digested sludge itself, which is supplied via the line 18 to the first reaction tank 10, is supplied, as shown in FIG. 2, at the sludge level 47 of the first reaction tank 10.

There is also the possibility to introduce a defoamer for reducing foaming on the sludge surface 47, via a line 66 or directly into the line 18.

In the outer area between the partition wall 40 and the outer wall 42, i.e. in the annular area 44, is a discharge shaft 98 which leads into a pipe 70, starting from which the sludge is supplied via the first line 14 to the second reaction tank 12.

The discharge from the first reaction tank 10 is in accordance with the positive displacement principle. When the first reaction tank 10 is supplied with sludge, sludge in the same volume proportion is simultaneously washed out of the first reaction tank 10.

The displacement is out of the lower area of the upper section 26 from the annular area 44 into the discharge shaft 98. Discharged sludge/water mix flows inside the discharge shaft 98 upwards—in the drawing illustration matching the direction of the arrow 74—in order to then reach the discharge area over a discharge sill 76, as indicated by the arrow 77.

The sludge or the sludge/water mix reaching the second reaction tank 12 via the first line 14 is subjected to an anaerobic environment. To ensure this, there is only gentle mixing (agitator 78) without any aeration. If bacteria contained in the digested sludge have absorbed more phosphate in the first reaction tank 10 under aerobic conditions parallel to orthophosphate crystallization, phosphorus redissolution leading to further MAP crystal formation or to crystal growth takes place under anaerobic conditions in the second reaction tank 12.

A predefined sludge/water mix quantity is then extracted continuously or intermittently, i.e. in batches, from the lower section 80, also having a conical or funnel shape, of the second reaction tank 12, whose upper area should have a cylindrical shape, and is recirculated via the second line 16 into the first reaction tank 10, as already explained above. To do so, there is a pump 84 in the second line 16.

Discharge from the second reaction tank 12 is achieved using an extraction pump 100. Inflowing sludge/water mix which is not recirculated into the first reaction tank 10 is extracted and discharged via this extraction pump 100. It is possible here to subject the sludge either directly to dewatering via a line 88 or optionally to pass it through a separator 90, such as a hydrocyclone, in order to separate MAP crystals or crystal nuclei still present in the sludge, which are then supplied via a third line 92 to the first reaction tank 10 and/or passed via a fourth line 102 back into the second reaction tank 12. These are substantially microcrystals.

The MAP crystals separated in the first reaction tank 10 pass into the separator 30, which extends from the lowest point of the lower section 28 of the reaction tank 10.

Regarding the separator 30, it should be noted that it can be designed closure-free on the tank side for its separation function. However, a closure can be provided that separates the separator from the tank, for example to perform maintenance work, for example on the connections 94, 96.

The separator 30 can consist for example of special steel and if necessary have an anti-stick coating, in particular on the inside, or can also be designed in steel with anti-stick coating on the inside. Typical diameters of a corresponding separator 30 are between 300 mm and 600 mm with a structural length of between 400 mm and 1500 mm.

The guide 31 can also consist of special steel or steel and if necessary be provided with an anti-stick coating. Typical diameters should be 300 mm to 600 mm. The maximum length corresponds to the height of the funnel-shaped or conical lower section 28 of the first reaction tank 10. Dimensioning/arrangement must be such that the MAP crystals can flow to the separator 30 without any disruption in the flow.

The volume of the first reaction tank 10 should correspond to 2 to 20 times the hourly volumetric inflow quantity to the first reaction tank 10. Identical dimensions for the second reaction tank 12 are preferable.

Regarding the air introduced via the membrane aerators 48, 50, it should be noted that the quantity should be 5 to 35 times the hourly volumetric inflow quantity into the first reaction tank 10.

The metering of magnesium chloride depends on the concentration of PO4, NH4 and Mg ions in the inflowing sludge.

An anaerobic environment should prevail in the second reaction tank 12 in accordance with the invention. For that reason only gentle mixing takes place. The energy input by the agitator 78 should be 2-20 Watts per $m^3$ of the sludge/water mix.

If the optionally provided pre-acidification is performed, the pH value in the pre-acidification should not drop below 5.0.

The invention claimed is:

1. A method for recovering magnesium ammonium phosphate from sludge supplied to a reaction tank in which an aerobic environment prevails, and in which the sludge is guided in a cycle supported by aeration, with cationic magnesium being added to the sludge, and magnesium ammonium phosphate crystals precipitated from the sludge being removed via an extraction device provided in a floor area of the reaction tank, wherein substances collected in the extraction device, and containing the magnesium ammonium phosphate crystals, are loosened up, and/or flushed, and wherein gas and liquid are introduced into the extraction device alternatingly, and substances exiting the extraction device on a side of the tank by means of a guide are passed through a funnel-shaped, or conically designed lower section of the reaction tank, and subjected in an adjoining cylindrical upper section to a flow in the cylindrical upper section.

2. The method according to claim 1, wherein the gas and the liquid are introduced in the floor area of the interior of the extraction device.

3. The method according to claim 2, wherein the gas is air.

4. The method according to claim 2, wherein the liquid is service water.

5. The method according to claim 2, wherein the extraction device has a hollow-cylindrical internal geometry.

6. The method according to claim 1, wherein the cationic magnesium is magnesium chloride.

7. An arrangement for recovering magnesium ammonium phosphate from sludge, comprising a reaction tank with a cylindrical upper section that merges into a funnel-shaped, or conically designed lower section, from which, in turn, extends an extraction device for magnesium ammonium phosphate crystals, at least one aerator device being provided in the upper section, and
wherein the extraction device has at least one first connection for gas to be introduced, and at least one second connection for liquid to be introduced, and a guide aligned with the extraction device, and having a hollow-cylindrical geometry with widening on a side of the extraction device for passing substances washed upward in the extraction device into the cylindrical upper section, is arranged in the lower section.

8. The arrangement according to claim 7, wherein, in a floor area of the extraction device, several first connections and/or several second connections are provided.

9. The arrangement according to claim 8, wherein the several first connections, and/or the several second connections, are evenly distributed around the circumference of the extraction device.

10. The arrangement according to claim 7, wherein first and second connections are connected alternatingly to the extraction device.

11. The arrangement according to claim 7, wherein the interior of the extraction device collecting the magnesium ammonium phosphate crystals has a cylindrical or conical geometry.

12. The arrangement according to claim 7, wherein the extraction device is designed closure-free on a side of the tank.

13. The arrangement according to claim 7, wherein a closure device is located on a floor side of the extraction device.

14. The arrangement according to claim 13, wherein the closure device is selected from a shutoff valve and a rotary valve.

15. The arrangement according to claim 7, wherein the longitudinal axis of the guide coincides with the longitudinal axis of the extraction device.

16. The arrangement according to claim 7, wherein the longitudinal axis of the guide coincides with the longitudinal axis of the reaction tank.

* * * * *